United States Patent
Corinthios

(12) 
(10) Patent No.: US 6,401,189 B1
(45) Date of Patent: Jun. 4, 2002

(54) GENERAL BASE STATE ASSIGNMENT FOR OPTIMAL MASSIVE PARALLELISM

(76) Inventor: Michael J. Corinthios, 5999 Monkland, Apt. 1204, Montreal (CA), H4A 1H1

(*) Notice: Subject to any disclaimer, the term of this patent is extended or adjusted under 35 U.S.C. 154(b) by 0 days.

(21) Appl. No.: 09/130,203

(22) Filed: Aug. 5, 1998

(51) Int. Cl.[7] .............................................. G06F 15/00
(52) U.S. Cl. ............................................. 712/13; 15/14
(58) Field of Search .............................. 712/11, 17, 15, 712/70, 13, 14

(56) References Cited

U.S. PATENT DOCUMENTS

| | | |
|---|---|---|
| 4,845,660 A | 7/1989 | Luc et al. |
| 4,916,657 A | 4/1990 | Morton |
| 4,980,822 A | 12/1990 | Brantley, Jr. et al. |
| 5,471,412 A | 11/1995 | Shyu |
| 5,475,856 A | 12/1995 | Kogge |
| 5,513,371 A | 4/1996 | Cypher et al. |
| 5,644,517 A | 7/1997 | Ho |
| 5,669,008 A | 9/1997 | Galles et al. |
| 5,689,722 A | 11/1997 | Swarztrauber |
| 5,963,746 A * | 10/1999 | Barker et al. ................ 712/20 |

OTHER PUBLICATIONS

Corinthios, A New Class of General–Base Matrices and A Formalism For Optimal Parallel/Pipelined Computer Architecture, 1993.*

"Optimal Parallel and Pipelined Processing Through a New Class of Matrices with Application to Generalized Spectral Analysis", Michael J. Corinthios, IEEE Transactions on Computers, vol. 43, No. 4, Apr. 1994, pp. 443–449.

"3D Cellular Arrays for Parallel/Cascade Image/Signal Processing", Michael J. Corinthios, Department of Electrical Engineering Ecole Polytechnique de Montreal, Montreal, Canada, Copyright 1985, by Academic Press, Inc., pp. 217–298.

"The Design of a Class of Fast Fourier Transform Computers", Michael J. Corinthios, IEEE Transactions on Computers, vol. C–20, No. 6, Jun. 1971, pp. 617–623.

(List continued on next page.)

*Primary Examiner*—Larry D. Donaghue
(74) *Attorney, Agent, or Firm*—Jacobson Holman, PLLC

(57) ABSTRACT

General base hypercube transformations using general base perfect shuffles and Kronecker matrix products are applied to the problem of parallel, to massively parallel processing of sparse matrices. The approach is illustrated by applying the hypercube transformations to general base factorizations of generalized spectral analysis transformation matrices. Hypercube transformations lead to optimal scheduling with contention-free memory allocation at any level of parallelism and up to massive parallelism. The approach is illustrated by applying the generalized-parallelism hypercube transformations to factorizations of generalized spectral analysis transformation matrices, and in particular to Generalized Walsh-Chrestenson transformation matrices of which the Discrete Fourier transform and hence the Fast Fourier transform are but a special case. These factorizations are a function of four variables, namely, the general base p, the number of members of the class of matrices n, a parameter k describing the matrix structure and the number M of parallel processing elements. The degree of parallelism, in the form of $M=p^m$ processors can be chosen arbitrarily by varying m between zero to its maximum value of n−1. The result is an equation describing the solution as a function of the four variables n, p, k and m.

4 Claims, 2 Drawing Sheets

OTHER PUBLICATIONS

"A Parallel Algorithm for State Assignment of Finite State Machines", Gagan Hasteer and Prithviraj Banerjee, IEEE Transactions on Computers, vol. 47, No. 2, Feb. 1998, pp. 242–246.

"Hypercube Algorithms and Implementations", Oliver A. McBryan and Eric F. Van De Velde, published Nov., 1985, pp. 227–287.

"Parallel Processing with the Perfect Shuffle", Harold S. Stone, IEEE Transactions on Computers, C–2, No. 2, Feb. 1971, pp. 153–161.

"Design of a Massively Parallel Processor", Kenneth E. Batcher, IEEE Transcations on Computers, vol. C–29, No. 9, Sep. 1980, pp. 836–840.

"Access and Alignment of Data in an Array Processor", Duncan H. Lawrie, IEEE Transactions on Computers, vol. C–24, No. 12, Dec. 1975, pp. 1145–1155.

"Fast Fourier Transforms Over Finite Groups By Multiprocessor System", Tatyana D. Roziner, Mark G. Karpovsky, and Lazar A. Trachtenberg, IEEE Transactions on Acoustics, Speech, and Signal Processing vol. 38, No. 2, Feb. 1990, pp. 226–240.

"An Architecture for a Video Rate Two–Dimensional Fast Fourier Transform Processor", G.F. Taylor, R.H. Steinvorth, and J.F. McDonald, IEEE Transactions on Computers, vol. 37, No. 9, Sep. 1988, pp. 1145–1151.

"Fault–Tolerant FFT Networks", Jing–Yang Jou and Jacob A. Abraham, IEEE Transactions on Computers, vol. 37, No. 5, May 1988, pp. 548–561.

"Design of a Multiple–Valued Systolic System for the Computation of the Chrestenson Spectrum", IEEE Transactions on Computers, vol. C–35, No. 2, Feb. 1986, pp. 183–188.

"Matrix Representations for Sorting and the Fast Fourier Transform, Harry Sloate", IEEE Transactions on Circuits and System, vol. CAS–21, No. 1, Jan. 1974, pp. 109–116.

"General Base State Assignment for Massive Parallelism", Michael J. Corinthios, submitted for consideration toward publication, IEEE Trans. Comput., May, 1998, pp. 1–30.

* cited by examiner- $Q_0 = CJ_1$ $Q_1 = CJ_2$ $Q_2 = C$ $\Gamma_2$

GENERAL BASE STATE ASSIGNMENT FOR OPTIMAL MASSIVE PARALLELISM

FIELD OF THE INVENTION

A formalism and an algorithm for the general base parallel dispatch and sequencing state assignment of optimal general-base massively parallel multiprocessing architecture are presented. Transformations of a base-p hypercube, where p is an arbitrary integer, are shown to effect a dynamic contention-free general base optimal memory allocation of the parallel to massively parallel multiprocessing architecture. The formalism is shown to provide a single unique description of the architecture and sequencing of parallel operations. The approach is illustrated by factorizations involving the processing of matrices, which are function of four variables. Parallel operations are implemented matrix multiplications. Each matrix, of dimension N×N, where $N=p^n$, n integer, is a sampling matrix of which the structure depends on a variable parameter k. The degree of parallelism, in the form of $M=p^m$ processors can be chosen arbitrarily by varying m between zero to its maximum value of n−1. The result is an equation describing the solution as a function of the four variables n, p, k and m.

Applications of the approach are shown in relation with complex matrix structures of image processing and generalized spectral analysis transforms but cover a much larger class of parallel processing and multiprocessing systems.

BACKGROUND OF THE INVENTION

Most computer arithmetic operations encountered in information processing algorithms in general and signal processing and sorting algorithms in particular call for iterative multiplications of large matrices. An approach and a formalism for designing optimal parallel/pipelined algorithms and processor architectures for effecting such operations has been recently proposed in Optimal Parallel and Pipelined Processing Through a New Class of Matrices with Application to Generalized Spectral Analysis", Michael J. Corinthios, IEEE Trans. Comput., Vol. 43, April 1994, pp. 443–459. The algorithms are optimal in their minimization of addressing requirements, of shuffle operations and of the number of memory partitions they call for. The algorithms and corresponding architectures involve general base matrix factorizations. As an application, the factorizations and corresponding optimal architectures are developed in Optimal Parallel and Pipelined Processing Through a New Class of Matrices with Application to Generalized Spectral Analysis", Michael J. Corinthios, IEEE Trans. Comput., Vol. 43, April 1994, pp. 443–459, to obtain optimal parallel-pipelined processors for the Generalized Walsh-Chrestenson transform, of which the Discrete (fast) Fourier transform is but a special case.

SUMMARY OF THE INVENTION

This invention describes a technique for designing optimal multiprocessing parallel architectures which employ multiples of general-base processors operating in parallel in an optimal global architecture. A formalism and closed forms are developed defining the state and sequencing assignments in a programmable hierarchical level of parallelism at each step of the algorithm execution.

A class of hierarchically parallel multiprocessing architectures employing general-base universal processing elements previously introduced as basic tools for multiprocessing as in 3-D cellular arrays for parallel/cascade image/signal processing", Michael J. Corinthios, in Spectral Techniques and Fault Detection, M. Karpovsky, Ed. New York: Academic Press, 1985, "The Design of a class of Fast Fourier Transform Computers", Michael J. Corinthios IEEE Trans. Comput., Vol. C-20, pp. 617–623, June 1971 is presented. Applications of the perfect shuffle matrices and hypercube representations to other classes of problems such as sorting and interconnection networks have received attention over the course of many years in 3-D cellular arrays for parallel/cascade image/signal processing", Michael J. Corinthios in Spectral Techniques and Fault Detection, M. Karpovsky, Ed. New York: Academic Press, 1985, "The Design of a class of fast Fourier Transform Computers", Michael J. Corinthios IEEE Trans. Comput., Vol. C-20, pp. 617–623, June 1971, "A Parallel Algorithm for State Assignment of Finite State Machines", G. Hasteer and P. Banerjee, IEEE Trans. Comput., vol. 47, No. 2, pp. 242–246, February 1998, "Hypercube Algorithms and Implementations", O. A. Mc Bryan and E. F. Van De Velde, SIAM J. Sci. Stat. Comput., Vol. 8, No. 2, pp. s227–287, Mar. 1987, "Parallel Processing with the Perfect", H. S. Stone, IEEE Trans. Comput. Vol. C-20, No. 2, pp. 153–161, February 1971, "Design of a Massively Parallel Processor", K. E. Batcher, IEEE Trans. Comput, pp 836–840, September 1980. Advances in state assignment and memory allocation for array processors, using processing elements as multiprocessing cells, and their interconnection networks have been made in the last two decades by Parallel Processing with the Perfect", H. S. Stone, IEEE Trans. Comput. Vol. C-20, No. 2, pp. 153–161, February 1971, "Hierarchical Fat Hypercube Architecture for Parallel Processing Systems", Galles, Michael B., U.S. Pat. No. 5,669,008, September 1997. Many of these contributions applied parallel and multiprocessing architectures to signal processing applications and in particular spectral analysis algorithms. In more recent years applications of parallel and multiprocessing techniques have focused on generalized spectral analysis, Discrete Cosine, Haar, Walsh and Chrestenson Transforms, among others in Optimal Parallel and Pipelined Processing Through a New Class of Matrices with Application to Generalized Spectral Analysis", Michael J. Corinthios, IEEE Trans. Comput., Vol. 43, April 1994, pp. 443–459.", "3-D cellular arrays for parallel/cascade image/signal processing", Michael J. Corinthios in Spectral Techniques and Fault Detection, M. Karpovsky, Ed. New York: Academic Press, 1985, "Parallel Processing with the Perfect", H. S. Stone, IEEE Trans. Comput. Vol. C-20, No. 2, pp. 153–161, February 1971, "Access and Alignment of Data in an Array Processor", D. H. Lawrie, IEEE Trans. Comput., vol C-24, No. 2, December 1975, pp 1145–1155, "Fast Fourier Transforms over Finite Groups by Multiprocessor Systems", Roziner, T. D., Karpovsky, M. G., and Trachtenberg, L. A., IEEE Trans. Accous., Speech, and Sign. Proc., ASSP, vol. 38, No. 2, February 1990, pp 226–240, "An Architecture for a Video Rate Two-Dimensional Fast Fourier Transform processor", Taylor, G. F., Steinvorth, R. H., and MacDonald J., IEEE Trans. Comput., vol. 37, No. 9, September 1988, pp 1145–1151. "Fault tolerant FFT Networks", IEEE Trans. Comput., vol. 37, No. 5, May 1988, pp. 548–561, Jou, Y.-Y. and Abraham, J. A., "Design of Multiple-Valued Systolic System for the Computation of the Chrestenson Spectrum", Moraga, Claudio, IEEE Trans. Comput., Vol. C-35, No. 2, February 1986, pp 183–188. "Matrix Representation for Sorting and the Fast Fourier Transform", Sloate, H., IEEE Trans. Circ. And Syst., Vol. CAS-21, No. 1, January 1974, pp 109–116, "Processor for Signal processing and Hierarchical Multiprocessing Structure Including At Least One Such Processor", Luc Mary and Barazesh, Bahman, U.S. Pat. No. 4,845,660, July 1989. In 3-D cellular arrays for parallel/cascade image/signal processing", Michael J. Corinthios, in Spectral Techniques and Fault Detection, M. Karpovsky, Ed. New York: Academic Press, 1985, three-dimensional parallel and pipelined architectures of cellular array multiprocessors employ Configurable Universal Processing Elements (CUPE) forming what were referred to as 'Isostolic Arrays', applied to signals as well as images in Optimal Parallel and Pipelined Processing Through a New Class of Matrices with Application to Generalized Spectral Analysis", Michael J. Corinthios, IEEE Trans. Comput., Vol. 43, April 1994, pp. 443–459.", "3-D cellular arrays for parallel/cascade image/signal processing", Michael J. Corinthios, in Spectral Techniques and Fault Detection, M. Karpovsky, Ed. New York: Academic Press, 1985.

Many patents of invention deal with the subject of hypercube transformations such as described in U.S. Pat. Nos. 5,669,008, 5,644,517, 5,513,371, 5,689,722, 5,475,856, 5,471,412, 4,980,822, 916,657 and 4,845,660. The present invention is unique in its concept of a generalized level of massive parallelism. The formulation is presented for an arbitrary number of M processing elements, $M=p^m$, p being the general radix of factorization. The input data vector dimension N, or input data matrix dimension N×N, where $N=p^n$, the radix of factorization of the matrix p, the number of processors M, and the span, Optimal Parallel and Pipelined Processing Through a New Class of Matrices with Application to Generalized Spectral Analysis", Michael J. Corinthios, IEEE Trans. Comput., Vol. 43, April 1994, pp. 443–459, of the matrix are all variable. A unique optimal solution yielding parallel to massively parallel optimal architectures, as optimality is defined in Optimal Parallel and Pipelined Processing Through a New Class of Matrices with Application to Generalized Spectral Analysis", Michael J. Corinthios, IEEE Trans. Comput., Vol. 43, April 1994, pp. 443–459 is presented.

The approach, which was recently submitted for publication, and submitted as a Disclosure Document is illustrated by developing a formalism and optimal factorizations for the class of algorithms of generalized spectral analysis introduced recently in Optimal Parallel and Pipelined Processing Through a New Class of Matrices with Application to Generalized Spectral Analysis", Michael J. Corinthios, IEEE Trans. Comput., Vol. 43, April 1994, pp. 443–459. It has been shown in Optimal Parallel and Pipelined Processing Through a New Class of Matrices with Application to Generalized Spectral Analysis", Michael J. Corinthios, IEEE Trans. Comput., Vol. 43, April 1994, pp. 443–459, that transforms such as Fourier and more generally Chrestenson Generalized-Walsh (CGW) transforms can be factored into optimal forms.

Basic Definitions

In what follows we use some matrix definitions, such as the definition of a sampling matrix, a matrix poles and zeros, a matrix span, fixed topology processor and shuffle-free processor introduced in Optimal Parallel and Pipelined Processing Through a New Class of Matrices with Application to Generalized Spectral Analysis", Michael J. Corinthios, IEEE Trans. Comput., Vol. 43, April 1994, pp. 443–459. In addition we adopt the following definitions which will be formally introduced in latter sections.

General Base Processing Element

In what follows a general-base processing element PE with a base, or radix, p is a processor that receives simultaneously p input operands and produces simultaneously p output operands. The PE in general applies arithmetic or weighting operations on the input vector to produce the output vector. In matrix multiplication operations for example the PE applies a p×p matrix to the p-element input vector to produce the p-element output vector. The matrix elements may be real or complex.

Due to the diversified general applicability of such a processing element a Universal Processing Element UPE, which can be constructed in a 3D-type architecture has been recently proposed in Optimal Parallel and Pipelined Processing Through a New Class of Matrices with Application to Generalized Spectral Analysis", Michael J. Corinthios, IEEE Trans. Comput., Vol. 43, April 1994, pp. 443–459.", "3-D cellular arrays for parallel/cascade image/signal processing", Michael J. Corinthios, in Spectral Techniques and Fault Detection, M. Karpovsky, Ed. New York: Academic Press, 1985. Its 3D-type architecture is such that its intermediate computation results are propagated between planes rather than in 2D along a plane. It may be viewed as a base-p processing element, operating on the p elements of an input vector simultaneously, applying to it a general p×p matrix and producing p output operands as the p-element output vector. A UPE has $p \times p = p^2$ multipliers but may be instead realized in a 3D architecture, in particular if the matrix is a transformation matrix that can be itself factored as in "3-D cellular arrays for parallel/cascade image/signal processing", Michael J. Corinthios, in Spectral Techniques and Fault Detection, M. Karpovsky, Ed. New York: Academic Press, 1985, "The Design of a class of Fast Fourier Transform Computers", Michael J. Corinthios IEEE Trans. Comput., Vol. C-20, pp. 617–623, June 1971. The pipelining approach described in Optimal Parallel and Pipelined Processing Through a New Class of Matrices with Application to Generalized Spectral Analysis", Michael J. Corinthios, IEEE Trans. Comput., Vol. 43, April 1994, pp. 443–459, can thus be used, leading to a 3D-type "isostolic" architecture Optimal Parallel and Pipelined Processing Through a New Class of Matrices with Application to Generalized Spectral Analysis", Michael J. Corinthios, IEEE Trans. Comput., Vol. 43, April 1994, pp. 443–459.

In the context of this invention a UPE may be seen simply as a general base-p processing element PE as defined above, accepting p inputs, weighting them by the appropriate p×p matrix and producing p output operands.

Pilot Elements, Pilots Matrix

Similarly to signals and images an N×N matrix may be sampled and the result is "impulses", that is, isolated elements in the resulting N×N samples (sampling) matrix. We shall assume uniform sampling of rows and columns yielding p uniformly spaced samples from each of p rows and element alignment along columns, that is, p uniformly spaced samples along columns as well as rows. The samples matrix which we may refer to as a "frame" thus contains p rows of p equally spaced elements each, a rectangular grid of $p^2$ impulses (poles) which we shall call a "dispatch". With $N=p^n$ the $N^2$ elements of the "main" (or "parent") matrix may be thus decomposed into $N^2/p^2 = p^{n-2}$ such dispatches.

By fixing the row sampling period, the row span, as well as the column sampling period, the column span, it suffices to know the coordinates (indices) of the top left element, that is, the element with the smallest of indices, of a dispatch to directly deduce the positions of all its other poles (elements). The top left element acts thus as a reference point, and we shall call it the "pilot element". The other $p^2-1$ elements associated with it may be called its "satellites".

In other words if the element $a_{ij}$ of A is a pilot element, the dispatch consists of the elements $a_{i+kc, j+lr}$; k=0,1, . . . ,p−1, l=0,1, . . . ,p−1 c and r being the column and row element spacings (spans), respectively.

A processing element assigned to a pilot element can thus access all $p^2$ operands of the dispatch, having deduced their positions knowing the given row and column spans.

Since each pilot element of a frame originated from the same position in the parent matrix we can construct a "pilots matrix" by keeping only the pilot elements and forcing to zero all other elements of the parent matrix. The problem then is one of assignment, simultaneous and/or sequential, of the M=$p^m$ processors to the different elements of the pilots matrix.

Hypercube Dimension Reduction

The extraction of a pilots matrix from its parent matrix leads to a dimension reduction of the hypercube representing its elements. The dimension reduction is in the form of a suppression, that is, a forcing to zero, of one of the hypercube digits. Let $C=(j_{n-1} \ldots j_1 j_0)_p$ be an n-digit base-p hypercube. We will write $C_{\bar{k}}$ to designate the hypercube C with the digit k suppressed, that is, forced to zero. Several digits can be similarly suppressed. For example, $C_{\bar{2}}$, $\bar{4}=(j_{n-1} \ldots j_5 0 j_3 0 j_1 j_0)_p$, and $C_{\overline{n-1}}=(0 j_{n-2} \ldots j_1 j_0)_p$. It is interesting to note that the hypercube dimension reduction implies a "skipping" over its zeros in permutation operations such as those involving the perfect shuffle. For example, if $A=C_{\bar{2}}$ then $PA=(j_0 j_{n-1} \ldots j_5 0 j_3 j_1)_p$.

State Assignment Algorithm

A sequence of perfect shuffle operations effected through simple hypercube transformations can be made to broadcast the state and access assignments to the different processors. The overall approach is described by the following algorithm which will be developed step by step in what follows.

---
Algorithm 1:
Parallel Dispatch, State Assignment and Sequencing Algorithm
---

Read base p
n = $\log_p$ N
m = $\log_p$ M
Read Input matrix name A
For k=0 to n−1 do
  For r = 0 to n−2 do
    begin
      Assign variables $i_0, i_1, \ldots, i_{m-1}$ to M = $p^m$ processors
      Evaluate row span $\sigma_R$
      Evaluate column span $\sigma_c$
      Test optimality
      Select scan type
      Evaluate pitch
      Dispatch M parallel processors
      Assign variables $j_m, j_{m+1}, \ldots, j_{n-1}$ to the access sequencing order of each processor.
      Effect hypercube transformations,
        $(j_{n-1} \ldots j_{m+1} j_m i_{m-1} \ldots i_1 i_0) \rightarrow (j_{n-1} \ldots j_{m+1} j_m i_{m-1} \ldots i_1 i_0)'$
      for k = 0 to $p^{n-m-1}$ do
        begin
          Fork NEXT
          Dispatch processor to Pilot address $$\left. \begin{array}{l} w(j_{n-1} \ldots j_{m+1} j_m i_{m-1} \ldots i_1 i_0)', \\ z(j_{n-1} \ldots j_{m+1} j_m i_{m-1} \ldots i_1 i_0)''. \end{array} \right\} 0 \le l \le m-1$$

NEXT
        for s = 0, 1, . . . , p−1
          $w_R(s) \leftarrow w + s\, \sigma_R$
          $z_c(s) \leftarrow z + s\, \sigma_c$ ---
-continued Algorithm 1:
Parallel Dispatch, State Assignment and Sequencing Algorithm
--- end
    end
  Increment j for sequential cycles
  end
end

The Parallel Dispatch, State Assignment and Sequencing Algorithm 1 dispatches the M=$p^m$ processors for each stage of the matrix factorization. The base-p m tuple $(i_{m-1} i_{m-2} \ldots i_1 i_0)_p$ is assigned to the parallel processors. The (n-m) tuple $(j_{n-1} j_{n-2} \ldots j_m)$ is assigned to the sequencing cycles of each processor. The algorithm subsequently applies hypercube transformations as dictated by the type of matrix, the stage of matrix factorization and the number of dispatched processors. It tests optimality to determine the type of scan of matrix elements to be applied and evaluates parameters such as pitch and memory optimal queue length, to be defined subsequently, it accesses the pilot elements and their satellites, proceeding to the parallel dispatch and sequencing of the processing elements.

Each processing element at each step of the algorithm thus accesses from memory its p input operands and writes into memory those of its output operands. The algorithm, while providing an arbitrary hierarchical level of parallelism up to the ultimate massive parallelism, produces optimal multiprocessing machine architecture minimizing addressing, the number of memory partitions as well as the number of required shuffles. Meanwhile it produces virtually wired-in pipelined architecture and properly ordered output.

Matrix Decomposition

In developing techniques for the multiprocessing of matrix multiplications it is convenient to effect a decomposition of a matrix into the sum of matrices. To this end let us define an "impulse matrix" as the matrix $\delta(i,j)$ of which all the elements are zero except for the element at position (i,j), that is, $$[\delta(i,\, j)]_{uv} = \begin{cases} 1; & u = i,\quad v = j \\ 0; & \text{otherwise} \end{cases} \quad (4.1)$$

An N×N matrix A having elements $[A]_{i,j}=a_{ij}$ can be written as the sum $$A = a_{0,0}\delta(0,0) + a_{0,1}\delta(0,1) + a_{0,2}\delta(0,2) + \ldots + a_{1,0}\delta(1,0) + a_{1,1}\delta(1,1) + \ldots + a_{N-1, N-1}\delta(N-1, N-1) \quad (4.2)$$

where the $\delta(i,j)$ matrices are of dimension N×N each. The matrix A can thus be written in the form $$A = \sum_{i=0}^{N-1} \sum_{j=0}^{N-1} a_{i,j} \delta(i,\, j) \quad (4.3)$$

Furthermore, in the parallel processing of matrix multiplication to a general base p it is convenient to decompose an N×N matrix with N=$p^n$ as the sum of dispatches, a dispatch being, as mentioned earlier, a matrix of $p^2$ elements arranged in a generally rectangular p×p pattern of p columns and p rows. Denoting by $\sigma_R$ and $\sigma_C$ the row and columns spans in Optimal Parallel and Pipelined Processing Through a New Class of Matrices with Application to Generalized Spectral Analysis", Michael J. Corinthios, IEEE Trans.

Comput., Vol. 43, April 1994, pp. 443–459, of a dispatch we can decompose a matrix A into the form $$A = \sum_{i=0}^{N/p-1} \sum_{j=0}^{N/p-1} \sum_{k=0}^{p-1} \sum_{l=0}^{p-1} a_{i+k\sigma_C, j+l\sigma_R} \delta(i + k\sigma_C, j + l\sigma_R) \quad (4.4)$$

More generally we may wish to decompose A in an order different from the uniform row and column scanning as in this last equation. In other words we may wish to pick the dispatches at an arbitrary order rather than in sequence. As mentioned above, we shall call the top left element the pilot element and its $p^2-1$ companions its satellites. In this last equation the pilot elements are those where k=1=0.

To effect a parallel matrix decomposition to a general base p we use hypercubes described by base-p digits. The order of accessing the different dispatches is made in relation to a main clock. The clock K is represented by the hypercube to base p as $$K \cong (k_{n-1} \ldots k_1 k_0)_p; \ k_t \in \{0,1, \ldots, p-1\} \quad (4.5)$$

Its value at any time is given by $$K = \sum_{t=0}^{n-1} p^t k_t \quad (4.6)$$

At each clock value K a set of M UPE's (PE's) is assigned a set of M dispatches simultaneously. We will reserve the symbols w and z to designate the row and column indices of a pilot element at clock K. In other words, at clock K each selected pilot element shall be designated $a_{w,z}$, that is, $[A]_{w,z}$ where w and z are functions of K to be defined. They will be determined in a way that optimizes the parallel and sequential operations for the given matrix structure and the number $M=p^m$ of available UPE's.

With $M=p^m$ base-p processing elements the hypercube representing K shall be re-written in the form $$K \cong (j_{n-1} \ldots j_{m+1} j_m i_{m-1} \ldots i_1 i_0)_p \quad (4.7)$$

where we have written $$k_t = \begin{cases} i_t; & t = 0, 1, \ldots, m-1 \\ j_t; & t = m, m+1, \ldots, n-1 \end{cases} \quad (4.8)$$

The m-sub-cube $(i_{m-1}, \ldots i_1 i_0)$ designates operations performed in parallel. The remaining (n-m)-sub-cube $(j_{n-1}, \ldots j_{m+1}, j_m)$ designates operations performed sequentially by each of the M dispatched parallel processors. With $M=p^m$ processors dispatched in parallel at clock $K \cong (j_{n-1} \ldots j_{m+1} j_m i_{m-1} \ldots i_1 i_0)_p$ the matrix A can be decomposed in the form $$A = \quad (4.9)$$

$$\sum_{k_{n-2}=0}^{p-1} \cdots \sum_{k_{m+1}=0}^{p-1} \sum_{k_m=0}^{p-1} \left\langle \sum_{k_{m-1}=0}^{p-1} \cdots \sum_{k_1=0}^{p-1} \sum_{k_0=0}^{p-1} \sum_{l=0}^{p-1} \sum_{k=0}^{p-1} \right.$$

$$a_{w(k_0,k_1,\cdots,k_{n-1})+k\sigma_C, z(k_0,k_1,\cdots,k_{n-1})+l\sigma_R}$$

$$\delta[\{w(k_0, k_1, \cdots, k_{n-2}) + k\sigma_C\},$$

$$\left. \{z(k_0, k_1, \cdots, k_{n-2}) + l\sigma_R\}] \right\rangle$$

Where the "parentheses" < and > enclose the elements accessed in parallel. In what follows we write $P_{v,\mu}$ to designate the pilot element of processor No.v at real time clock $\mu$.

The CGW Transform

The lowest order base-p Chrestenson Generalized Walsh "core matrix" is the p-point Fourier matrix $$W_p = \frac{1}{\sqrt{p}} \begin{bmatrix} w^0 & w^0 & \cdots & w^0 \\ w^0 & w^1 & \cdots & w^{p-1} \\ \vdots & & & \\ w^0 & w^{p-1} & \cdots & w^{(p-1)^2} \end{bmatrix}, \quad (5.1)$$

where $$w = \exp(-j2\pi/p); \ j = \sqrt{-1}. \quad (5.2)$$

In the following, for simplicity, the scaling factor $1/\sqrt{p}$ will be dropped. We start by deriving three basic forms of the Chrestenson transform in its three different orderings.

The GWN Transformation Matrix

The GWN transformation matrix $W_N$ for $N=p^n$ data points is obtained from the Generalized-Walsh core matrix $W_p$ by the Kroneker multiplication of $W_p$ by itself n times.

$$W_{N,nat} = W_p \times W_p \times \ldots \times W_p (n \text{ times}) = W_p^{[n]}. \quad (5.3)$$

GWP Transformation Matrix

The Generalized Walsh transform in the GWP order is related to the transform in natural order by a digit-reverse ordering. The general-base digit reverse ordering matrix $K_N^{(p)}$ can be factored using the general-base perfect shuffle permutation matrix $P^{(p)}$ and Kroneker products $$K_N^{(p)} = \prod_{i=0}^{n-1} (P_{p^{(n-i)}}^{(p)} \times I_{p^i}). \quad (5.4)$$

Operating on a column vector x of dimension K the base-p Perfect Shuffle permutation matrix of dimension K×K produces the vector $$P_K x = [x_0, x_{K/p}, x_{2K/p}, \ldots, x_{(p-1)K/p}, x_1, x_{K/p+1}, \ldots,$$
$$x_2, x_{K/p+2}, \ldots, x_{K-1}] \quad (5.5)$$

The GWP matrix $W_{N,WP}$ can thus be written in the form $$W_{N,WP} = K_N^{(p)} W_{N,nat}. \quad (5.6)$$

$$= \prod_{i=0}^{n-1} (P_{p^{(n-i)}}^{(p)} \times I_{p^i}) W_p^{[n]}.$$

GWK Transformation Matrix

The GWK transformation matrix is related to the GWP matrix through a p-ary to Gray transformation matrix $G_N^{(p)}$.

$$W_{N,WK} = G_N^{(p)} W_{N,WP}. \quad (5.7)$$

The following factorizations lead to shuffle-free optimal parallel-pipelined processors.

A. GWN Factorization

A fixed topology factorization of the GWN transformation matrix has the form $$W_{N,nat} = \prod_{i=0}^{n-1} P_N C_N = \prod_{i=0}^{n-1} P_N (I_{N/p} \times W_p). \quad (5.7)$$

which can be re-written in the form $$W_{N,nat} = P\left\{\prod_{n=0}^{n-1} CP\right\}P^{-1} = P\left\{\prod_{n=0}^{n-1} F\right\}P^{-1}, \quad (5.8)$$

$$C = C_N = I_{p^{n-1}} \times W_p \quad (5.9)$$

And F=CP, noting that the matrix F is $p^2$-optimal in Optimal Parallel and Pipelined Processing Through a New Class of Matrices with Application to Generalized Spectral Analysis", Michael J. Corinthios, IEEE Trans. Comput., Vol. 43, April 1994, pp. 443–459.

B. GWP Factorization

We fixed topology factorization of the GWP matrix has the form $$W_{N,WP} = \prod_{i=0}^{n-1} J_i C_N \quad (5.10)$$

$$J_i = (I_{p^{n-i-1}} \times P_{p^{i+1}}) = H_{n-i-1} \quad (5.11)$$

Letting $$Q_i = C_N J_{i+1} = C_n H_{n-i-2}; i=0,1,\ldots,n-2 \; Q_{n-1} = C_N \quad (5.12)$$

we obtain $$W_{N,WP} = \prod_{i=0}^{n-1} Q_i, \quad (5.13)$$

where each matrix $Q_i$; i=0, 1, . . . , n−2, is $p^2$-optimal, while $Q_{n-1}$ is p-optimal.

C. GWK Factorization

The fixed topology GWK factorization has the form $$W_{N,WK} = P\left\{\prod_{i=0}^{n-1} P^{-1} H_i C_N E_i\right\} P^{-1}. \quad (5.14)$$

Letting $$H_i = I_{p^i} \times P_{p^{n-i}}, E_i = I_{p^i} \times D'_{p^{n-i}} \quad (5.15)$$

$$D'_{p^n} = \text{quasidiag}(I_{p^{n-1}}, D_{p^{n-1}}, D^2_{p^{n-1}}, \ldots, D_{p^{n-1}}^{(p-1)}) \quad (5.16)$$

$$D^i_{p^{n-1}} = D^i_p \times I_{p^{n-2}}$$

$$D_p = \text{diag}(w^0, w^{-1}, w^{-2}, \ldots, w^{-(p-1)}). \quad (5.17)$$

$$W_{N,WK} = P\left\{\prod_{i=0}^{n-1} P^{-1} H_i G_i\right\} P^{-1}, \quad (5.18)$$

where $$G_i = C_N E_i. \quad (5.19)$$

Letting $$S_i = P^{-1} H_i P = (I_{p^{i-1}} \times P_{p^{n-i}} \times I_p) \quad (5.20)$$

we have $$W_{N,WK} = P^2\left\{\prod_{i=0}^{n-1} P^{-1} G_i S_{i+1}\right\} P^{-1} \quad (5.21)$$

with $$S_{n-1} = S_n = I_N. \quad (5.22)$$

The factorization can also be re-written in the form $$W_{N,WK} = P\left\{\prod_{i=0}^{n-1} \Gamma_i\right\} P^{-1}, \quad (5.23)$$

where $$\Gamma_i = P^{-1} G_i S_{i+1} \quad (5.24)$$
$$= P^{-1} G_i (I_{p^i} \times P_{p^{n-i-1}} \times I_p) \; i = 1, 2, \cdots, n-1;$$
$$\Gamma_0 = G_0 S_1.$$

The matrices $\Gamma_i$ are $p^2$-optimal, except for $\Gamma_0$ which is maximal span. These are therefore optimal algorithms which can be implemented by an optimal parallel processor, recirculant or pipelined, with no shuffling cycle called for during any of the n iterations.

Image Processing

The potential in enhanced speed of processing of the optimal algorithms is all the more evident within the context of real-time image processing applications. For 2D signals, algorithms of generalized spectral analysis can be applied on sub-images or on successive column-row vectors of the input image. Factorizations of the algorithms of the Chrestenson transform applied on an N×N points matrix X representing an image, with N=$p^n$ can be written for the different transform matrices. The GWN 2D transformation for optimal pipelined architecture can be written in the form $$Y_{nat} = P\left\{\prod_{i=0}^{n-1} F\right\} P^{-1} \times \left[P\left\{\prod_{i=0}^{n-1} F\right\} P^{-1}\right]^T \quad (6.1)$$

$$= P\left\{\prod_{i=0}^{n-1} F\right\} P^{-1} \times P\left\{\prod_{i=0}^{n-1} F\right\} P^{-1},$$

where T stands for transpose. The GWP factorization can be written in the form $$Y_{WP} = \prod_{i=0}^{n-1} Q_i \times \left(\prod_{i=0}^{n-1} Q_i\right)^T \quad (6.2)$$

$$= \prod_{i=0}^{n-1} Q_i \times \prod_{i=0}^{n-1} Q_{n-i-1}^T,$$

$$Q_i^T = C_N(I_{p^{n-i-1}} \times P_{p^{i+1}}^{-1}). \quad (6.3)$$

The GWK factorization for optimal pipelined architecture can be written in the form $$Y_{WK} = P^2 \left\{ \prod_{i=0}^{n-1} \Gamma_i \right\} P \times \left[ P^2 \left\{ \prod_{i=0}^{n-1} \Gamma_i \right\} P \right]^T \quad (6.4)$$

$$= P^2 \left\{ \prod_{i=0}^{n-1} \Gamma_i \right\} P \times P^{-1} \left\{ \prod_{i=0}^{n-1} \Gamma_{n-i-1}^T \right\} P^{-2},$$

$$\Gamma_i^T = (I_{p^i} \times P_{p^{n-i-1}}^{-1} \times I_p) G_i^{-1} P. \quad (6.5)$$

These fast algorithms are all $p^2$-optimal requiring no shuffling between iterations of a pipelined processor. In applying these factorizations the successive iterations are effected on successive sub-images such that after $\log_p N$ stages the transform image Y is pipelined at the processor output. Applications include real-time processing of video signals.

The Fourier transform is but a special case of the Chrestenson Generalized Walsh transform. The Fourier matrix for N points is the matrix $F_N$ defined above in (1) with p replaced by N:

$$F_N = \begin{bmatrix} w^0 & w^0 & \cdots & w^0 \\ w^0 & w^1 & \cdots & w^{N-1} \\ w^0 & w^2 & \cdots & w^{2(N-1)} \\ w^0 & w^{N-1} & \cdots & w^{(N-1)^2} \end{bmatrix} \quad (6.6)$$

For images the factorization leads to the optimal form $$Y_F = \left\{ \prod_{i=0}^{n-1} F_i \right\} \times \left\{ \prod_{k=0}^{n-1} F_{n-k-1} \right\} \quad (6.7)$$

and for unidimensional signals the corresponding form for the Fourier matrix is $$F_N = \prod_{i=0}^{n-1} (F_i) \quad (6.8)$$

$F_i = U_i C_i$ $C_i = C J_{i+1}$; $i = 0, 1, \ldots, n-1$ $C_{n-1} = C$ \quad (6.9)

$U_1 = I_N$ $U_i = I_{p^{n-i-1}} \times D_{p^{i+1}} = I_{p^{n-i-1}} \times D_{N/p^{n-i-1}}$ $D_{N/m} = \text{diag}(I_{N/(pm)}, K_m, K_2^m, \ldots, K_m^{p-1})$ $K_t = \text{diag}(w^0, w^t, \ldots, w^{[N/(mp)-1]t})$ \quad (6.10)

Perfect Shuffle Hypercube Transformations

The hypercube transformations approach is illustrated using the important matrices of the Chrestenson Generalized Walsh-Paley (CGWP), Generalized Walsh-Kaczmarz (CGWK) and Fourier transforms.

We note that the matrices $C_k$ in the Fourier transform expansion are closely related to the matrices $J_i$ and $H_i$ in the Chrestenson Generalized Walsh Paley factorization. In fact the following relations are readily established:

$C_N \triangleq C$ $C_i = C J_{i+1} = C H_{n-i-2} = Q_i$ \quad (7.1)

$Q_{n-1} = C_{n-1} = C$ \quad (7.2)

Therefore, the CGWP matrices $Q_i$ are the same as the $C_i$ matrices and have the same structure as the $F_i$ matrices in the Fourier matrix factorization. Writing $B_k = C H_k$ \quad (7.3)

$H_k = I_p^k \times P_{p_{n-k}}$ \quad (7.4)

the post-multiplication by $H_k$ has the effect of permuting the columns of C so that at row w, $w \triangleq (0 j_{n-2} \ldots j_1 j_0)$ \quad (7.5)

the pilot element is at column z as determined by the permutation $H_k$, that is, $z \triangleq (j_k 0 j_{n-2} \ldots j_{k+1} j_{k-1} \ldots j_1 j_0)$ \quad (7.6)

with the special case $k = n-2$ producing $z \triangleq (j_{n-2} 0 j_{n-3} \ldots j_1 j_0)$ \quad (7.7)

and that of $k = n-1$ yielding $z \triangleq (0 j_{n-2} \ldots j_1 j_0)$ \quad (7.8)

Alternatively, we can write z directly as a function of w by using previously developed expressions of permutation matrices in Optimal Parallel and Pipelined Processing Through a New Class of Matrices with Application to Generalized Spectral Analysis", Michael J. Corinthios, IEEE Trans. Comput., Vol. 43, April 1994, pp. 443–459. For example, $B_0 = C H_0 = C P$ \quad (7.9)

and using the expression defining P, namely, $$[P_{p^n}^k]_{uv} = \begin{cases} 1; & u = 0, 1, \cdots, p^n - 1; \\ & v = [u + (u \bmod p^k)(p^n - 1)]/p^k \\ 0; & \text{otherwise}; \end{cases} \quad (7.10)$$

$k = 0, 1, \cdots, N - 1,$ with $k = 1$, we can write $z = [w + (w \bmod p)(p^n - 1)]/p$ \quad (7.11)

a relation that defines the pilot elements matrix.
Similarly, $B_1 = C H_1 = C(I_p \times P_p^{N-1})$ \quad (7.12)

and from the definition given in Optimal Parallel and Pipelined Processing Through a New Class of Matrices with Application to Generalized Spectral Analysis", Michael J. Corinthios, IEEE Trans. Comput., Vol. 43, April 1994, pp. 443–459:

$$[P_i^t]_{uv} = \begin{cases} 1; & u = 0, 1, \cdots, p^n - 1; \\ & v = p^{i-t \bmod(n-i)}[p^{-i}(u - u \bmod p^i) + \\ & \{[p^{-i}(u - u \bmod p^i)] \bmod p^{t \bmod(n-i)}\} \\ & (p^{n-i} - 1)] + u \bmod p^i; \\ 0; & \text{otherwise;} \end{cases} \quad (7.13)$$

with i=1 and t=1 we have $$z=[p^{-1}(w-w \bmod p)+\{[p^{-1}(w-w \bmod p)] \bmod p\}(p^{n-1}-1)]+ w \bmod p. \quad (7.14)$$

Consider the permutation matrix $$R_N = R_{p_n} = I_{P_m} x P_{P_j} x I_{P_k} \quad (7.15)$$

Let the base-p hypercube describing the order in a vector x of $N=p^n$ elements be represented as the n-tuple.

$$x \triangleq (j_{n-1} \cdots j_1 j_0)_p, j_i \in \{0,1,\ldots,p-1\} \quad (7.16)$$

The application of the matrix $R_{p^N}$ on the n-tuple vector x, results in the n-tuple:

$$v=(j_{n-1} \cdots j_{n-k+1} j_{n-k} j_m j_{n-k-1} \cdots j_{m+2} j_{m+1} j_{m-1} \cdots j_1 j_0) \quad (7.17)$$

We note that with respect to x the left k digits and the right m digits are left unchanged while the remaining digits are rotated using a circular shift of one digit to the right.

The pilot-elements matrix $\beta_k$ corresponding to the matrix $B_k$ is obtained by restricting the values of w (and hence the corresponding z values) to w=0, 1, . . . , $p^{n-1}-1$.

Moreover, we note that if we write $$L_i = P^{-1} G_i = P^{n-1} G_i \quad (7.18)$$

and note that $G_i$ is similar in structure to $C_N$, we have $$z=[w+(w \bmod p^k)(p^n-1)]/p^k \quad (7.19)$$

with k=n−1.
To obtain the pilot elements matrix $\lambda_i$ corresponding to $L_i$ we write $$z'=z \bmod p^{n-1} \quad (7.20)$$

in order to reveal all satellite elements accompanying each pilot element. We then eliminate all the repeated entries in z' and the corresponding w values, retaining only pilot elements positions. Alternatively we simply force to zero the digit of weight n−2 in w and that of weight n−1 in z.

The CGWP Factorization

We presently focus our attention on the matrices $$B_k = CH_k; k=0,1,\ldots,n-1 \quad (8.1)$$

In evaluating the pilot elements coordinates we begin by setting the number of processors M=1. The corresponding w-z relation of the pilot elements are thus evaluated with m=0. Once this relation has been established it is subsequently used as the reference "w-z conversion template" to produce the pilot element positions for a general number of $M=p^m$ processors. A "right" scan is applied to the matrix in order to produce the w-z template with an ascending order of w. In this scanning type the algorithm advances the first index w from zero selecting pilot elements by evaluating their displacement to the right as the second index z. Once the template has been evaluated the value m corresponding to the number of processors to be dispatched is used to perform successive p-ary divisions in proportion to m to assign the M processors with maximum spacing, leading to maximum possible lengths of memory queues. A "down" scan is subsequently applied, where p-ary divisions are applied successively while proceeding downward along the matrix columns, followed by a selection of the desired optimal scan.

The template evaluation and subsequent p-ary divisions for the assignment of the M processors through a right type scan produce the following hypercube assignments. The assignments are as expected functions of the four variables n, p, k and m. The conditions of validity of the different assignments are denoted by numbers and letters for subsequent referencing. With K denoting the main clock, the following hypercube transformations are obtained $$K \triangleq (j_{n-1} \cdots j_{m+1} j_m^i i_{m-1} \cdots i_1 i_0)_p$$

$$K_{\overline{n-1}} \triangleq (0 j_{n-2} \cdots j_{m+1} j_m^i i_{m-1} \cdots i_1 i_0)_p$$

$$K_{\overline{n-2}} \triangleq (j_{n-1} 0 j_{n-3} \cdots j_{m+1}^j m i_{m-1} \cdots i_1 i_0)_p \quad (8.2)$$

L k<n−2
(1) x: m=0

$$w \triangleq K_{\overline{n-1}} \quad (8.3)$$

$$z \triangleq [(I_{P_k} x P_{P_{n-k}}) K]_{\overline{n-2}} \quad (8.4)$$

(2) y: 1≤m≤n−k−2

$$w \simeq \left[(P_{p^{k+1}} \times I_{p^{n-k-1}}) \prod_{t=1}^{m-1} (I_{p^t} \times P_{p^{n-t-1}} \times I_p) K\right]_{\overline{n-1}} \quad (8.5)$$

$$z \simeq \left[P_{p^n} \prod_{t=1}^{m-1} (I_{p^t} \times P_{p^{n-t-1}} \times I_p) K\right]_{\overline{n-2}} \quad (8.6)$$

(3) z: n−k−1≤m≤n−1

$$w \simeq \left[(P_{p^{k+1}} \times I_{p^{n-k-1}}) \prod_{t=1}^{m-1} (I_{p^t} \times P_{p^{n-t-1}} \times I_p) K\right]_{\overline{n-1}} \quad (8.7)$$

$$z \simeq \left[P_{p^n} \prod_{t=1}^{m-1} (I_{p^t} \times P_{p^{n-t-1}} \times I_p) K\right]_{\overline{n-2}} \quad (8.8)$$

II. k=n−2
(1) u: m=0

$$w \triangleq K_{\overline{n-1}}$$

$$z \triangleq [(I_{P_{n-2}} x P_{P_2}) K]_{\overline{n-2}} \quad (8.9)$$

(2) v: m≥1

$$w \simeq \left[\prod_{t=0}^{m-1} (I_{p^t} \times P_{p^{n-t-1}} \times I_p) K\right]_{\overline{n-1}} \quad (8.10)$$

$$z \simeq \left[P_{p^n} \prod_{t=1}^{m-1} (I_{p^t} \times P_{p^{n-t-1}} \times I_p) K\right]_{\overline{n-2}} \quad (8.11)$$

t: k=n−1

$$w = z \simeq \left[\prod_{t=0}^{m-1}(I_{p^t} \times P_{p^{n-t-1}} \times I_p)K\right]_{n-1} \quad (8.12)$$

Evaluated, these hypercubes yield the following pilot elements assignments:

x: (k<n−2, m=0)

$$w = \sum_{j=0}^{n-2} p^t j_t \quad (8.13)$$

$$z = \sum_{j=0}^{k-1} p^t j_t + p^{n-1} j_k + \sum_{t=k+1}^{n-2} p^{t-1} j_t \quad (8.14)$$

y: k<n−2, 1≦m≦n−k−2

$$w = p^k i_0 + \sum_{s=1}^{m-1} p^{n-1-s} i_s + \sum_{t=m}^{m+k-1} p^{t-m} j_t + \sum_{t=m+k}^{n-2} p^{t-m+1} j_t \quad (8.15)$$

$$z = p^{n-1} i_0 + \sum_{s=1}^{m-1} p^{n-2-s} i_s + \sum_{t=m}^{n-2} p^{t-m} j_t \quad (8.16)$$

z: k<n−2, n−k−1≦m≦n−1

$$w = p^k i_0 + \sum_{s=1}^{n-k-2} p^{n-1-s} i_s + \sum_{s=n-k-1}^{m-1} p^{n-2-s} i_s + \sum_{s=m}^{n-2} p^{t-m} j_t \quad (8.17)$$

$$z = p^{n-1} i_0 + \sum_{s=1}^{m-1} p^{n-2-s} i_s + \sum_{t=m}^{n-2} p^{t-m} j_t \quad (8.18)$$

u: k=n−2, m=0

$$w = \sum_{t=0}^{n-2} p^t j_t \quad (8.19)$$

$$z = \sum_{j=0}^{n-3} p^t j_t + p^{n-1} j_{n-2} \quad (8.20)$$

v: k=n−2, m≧1

$$w = \sum_{s=0}^{m-1} p^{k-s} i_s + \sum_{t=m}^{n-2} p^{t-m} j_t \quad (8.21)$$

$$z = p^{n-1} i_0 + \sum_{s=1}^{m-1} p^{k-s} i_s + \sum_{t=m}^{n-2} p^{t-m} j_t \quad (8.22)$$

t: k=n−1

$$w = z = \sum_{s=0}^{m-1} p^{n-2-s} i_s + \sum_{t=m}^{n-2} p^{t-m} j_t \quad (8.23)$$

Optimal Assignment

A processor is considered optimal if it requires a minimum of memory partitions, is shuffle free, meaning the absence of clock times used uniquely for shuffling and produces an ordered output given an ordered input in Optimal Parallel and Pipelined Processing Through a New Class of Matrices with Application to Generalized Spectral Analysis", Michael J. Corinthios, IEEE Trans. Comput., Vol. 43, April 1994, pp. 443–459. We have seen in Optimal Parallel and Pipelined Processing Through a New Class of Matrices with Application to Generalized Spectral Analysis", Michael J. Corinthios, IEEE Trans. Comput., Vol. 43, April 1994, pp. 443–459, that $p^2$-optimal algorithms and processors lead to a minimum number of $p^2$ partitions of $N/p^2$ queue length each. With $M=p^m$ base-p processors operating in parallel the number of partitions increases to $p^{m+2}$ and the queue length of each partition reduces to $N/p^{m+2}$.

An optimal multiprocessing algorithm should satisfy such optimality constraints. The horizontal spacing between simultaneously accessed pilot elements defines the input memory queue length. The vertical spacing defines the output memory queue length. With M processors applied in parallel the horizontal spacing between the accessed elements will be referred to as the "input pitch", while the vertical spacing as the "output pitch".

By choosing the pilot elements leading to the maximum possible pitch, which is the highest of the two values: the minimum input pitch and minimum output pitch, optimality in the form of $N/p^{m+2}$ queue length is achieved.

We note that Optimal Minimum memory queue length MMQL satisfies $$MMQL = \begin{cases} p^{n-m-2}; & m \leq n-2 \\ 1; & m = n-1 \end{cases}$$

The following algorithm, Algorithm 2, describes this approach to state assignment optimality.

Algorithm 2: Optimality search
begin
Extract pilots matrix
Apply right scan
Evaluate input pitch
Evaluate output pitch
$p_{i,min}$=min[input pitch]
$p_{o,min}$=min[output pitch]
$p_{r,min}$=min[$p_{i,min}$, $p_{o,min}$]
Apply down scan
Evaluate output pitch
$p_{i,min}$=min[input pitch]
$p_{o,min}$=min[output pitch]
$p_{d,min}$=min[$p_{i,min}$, $p_{o,min}$]
Optimal pitch=max[$p_{d,min}$, $p_{r,min}$]
If $p_{r,min} \geq p_{d,min}$ then optimal=right scan Else optimal=down scan
Apply hypercube transformations
Dispatch and sequence M processors
end In following the algorithm we note that in the validity condition y of the $B_k$ matrix y: 1≦m≦n−k−2 the results obtained are such that the digit $i_0$ of w is of a weight $p^k$. Hence the input pitch is $p^k$ while the output pitch which can be deduced from the position of $i_0$ in z is $p^{n-1}$, that is, maximal possible. The input pitch is thus function of k and can be low if k is small. By performing a down scan of $B_k$ we obtain the following solution:

k<n−2
y: 1≦m≦n−k−2
w: 0 $i_0$ $i_1$ ... $i_{m-1}$ $j_{n-2}$ ... $j_{m+1}$ $j_m$ z: $j_{m+k}$ 0 $i_0$ $i_1$ ... $i_{m-1}$ $j_{n-2}$ ... $j_{m+k+1}$ $j_{m+k-1}$ ... $j_{m+1}$
$j_m$ where now it is $i_{m-1}$ that leads to a minimum pitch and it has a weight of $p^{n-m-1}$ in w and $p^{n-m-2}$ in z. We deduce that the minimum pitch in this solution is $p^{n-m-2}$, which is the optimal sought. The same reasoning leads to the optimal assignment for the case k<n−2,
z: n−k−1 ≦ m ≦ n−1
  w: 0 $i_0$ $i_1$ ... $i_{m-1}$ $j_{n-2}$ ... $j_{m+1}$ $j_m$
  z: $i_{n-2-k}$ 0 $i_0$ $i_1$ ... $i_{n-3-k}$ $i_{n-1-k}$ $i_{n-k}$ ... $i_{m-1}$ $j_{n-2}$ ... $j_{m+1}$
$j_m$ These are the only two cases of the matrix that need be thus modified for optimality. All results obtained above for the other validity conditions can be verified to be optimal.

Matrix Span

In the above from one iteration to the next the value of k is incremented. In each iteration once the pilot element matrix coordinates (w, z) are determined as shown above each processor accesses p elements spaced by the row span starting with the pilot element and writes its p outputs at addresses spaced by the column span. The row and column spans of a matrix are evaluated as is shown in Optimal Parallel and Pipelined Processing Through a New Class of Matrices with Application to Generalized Spectral Analysis", Michael J. Corinthios, IEEE Trans. Comput., Vol. 43, April 1994, pp. 443–459. In particular we note that the matrix $$B_k = CH_k \quad (9.1)$$

has the same column span as that of C, namely $\sigma_c(B_k) = \sigma_c(C) = p^{n-1}$. The row span of $B_k$ is evaluated by noticing that $B_k$ has the same structure as C with its columns permuted in accordance with the order implied by $$H_k^{-1} = I_p \times P_{p^{n-k-1}} \quad (9.2)$$

The transformation of the hypercube ($i_{n-1}$ ... $i_1 i_0$) corresponding to $H_k^{-1}$ is one leading to a most significant digit equal to $i_{n-2}$. Since this digit changes value from 0 to 1 in a cycle length of $p^{n-2}$ we deduce that the row span of all the $B_k$ matrices is simply $$\sigma_R(B_k) = p^{n-2} \quad (9.3)$$

Each processing element thus accesses p operands spaced $p^{n-2}$ points apart and writes their p outputs at points which are $p^{n-1}$ points apart.

The CGWK Factorization

The sampling matrices of the GWK factorization are more complex in structure than the other generalized spectral analysis matrices. They are defined by $$\Gamma_i = P^{-1} G_i S_{i+1} \quad (11.1)$$

Let $$L_i \triangleq P^{-1} G_i \quad (11.2)$$

we have $$\Gamma_i = L_i S_{i+1} \quad (11.3)$$

We note that the sampling matrix $G_i$ has the same structure in poles and zeros in Optimal Parallel and Pipelined Processing Through a New Class of Matrices with Application to Generalized Spectral Analysis", Michael J. Corinthios, IEEE Trans. Comput., Vol. 43, April 1994, pp. 443–459, that is, in the positions of non-zero and zero elements respectively, as that of the matrix $C_N$. We can write for the matrix $G_i$ $$w_{G_i} \cong (j_{n-2} \ldots j_1 j_0)$$

$$z_{G_i} \cong (j_{n-2} \ldots j_1 j_0) \quad (11.4)$$

as the pilot elements positions.

Given the definition of the matrix $L_i$ a hypercube rotation corresponding to the matrix $P^{-1}$ would yield the w and z values of $L_i$ as:

$$w_{L_i} \cong (j_{n-2} 0 j_{n-3} \ldots j_1 j_0)$$

$$z_{L_i} = P^{-1} w_{L_i} \cong (0 j_{n-3} \ldots j_1 j_0 j_{n-2}) \quad (11.5)$$

Alternatively, a z-ordered counterpart can be written as:

$$z_{L_i} \cong (0 j_{n-2} \ldots j_1 j_0)$$

$$w_{L_i} \cong (j_0 0 j_{n-2} \ldots j_2 j_1) \quad (11.6)$$

Similarly, the matrix $\Gamma_0 = G_0 S_1$ which is obtained from $G_0$ by permuting its columns according to the order dictated by $$S_1^{-1} = P_{p^{n-1}}^{-1} \times I_p \quad (11.7)$$

leads to the m=0 template assignment $$w_{\Gamma_0} \cong (0 j_{n-2} \ldots j_1 j_0) \quad (11.8)$$

$$z_{\Gamma_0} = S_1 w_{\Gamma_0} \cong (0 j_0 j_{n-2} \ldots j_2 j_1) \quad (11.9)$$

and a similar z-ordered state assignment counter part.

For $$\Gamma_k = G_0 S_k; \; k > 0 \quad (11.10)$$

we have $$S_k^{-1} = I_{p^{k-1}} \times P_{p^{n-k-1}} \times I_p \quad (11.11)$$

which leads to the state template assignment $$w_{\Gamma_k} \cong w_{L_i} \cong (j_{n-2} 0 j_{n-3} \ldots j_1 j_0),$$

$$z_{\Gamma_k} = S_{k+1} z_{L_i} \cong (0 j_{k-1} j_{n-3} \ldots j_{k+1} j_k j_{k-2} \ldots j_1 j_0 j_{n-2}); \; k>0. \quad (11.12)$$

With m made variable a right scan yields the following expressions for the different validity conditions The $\Gamma_k$ Transformations 1. $k = 0$ $a: k = 0, m = 0 \quad w \simeq K_{\overline{n-1}}$ (11.13)

$z \simeq P_{p^n} K_{\overline{n-1}} \equiv [(P_{p^{n-1}} \times I_p)K]_{\overline{n-1}}$ $b: k = 0, m \geq 2 \quad w \simeq \left[\prod_{t=1}^{m-1}(I_{p^t} \times P_{p^{n-t-1}} \times I_p)K\right]_{\overline{n-1}}$ (11.14)

$z \simeq \left[\prod_{t=0}^{m-1}(I_{p^t} \times P_{p^{n-t-1}} \times I_p)K\right]_{\overline{n-1}}$ (11.15)

2. $1 \leq k \leq n - 3$ $c: m = 0 \quad w \simeq [(I_{p^{n-2}} \times P_{p^2})K]_{\overline{n-2}}$ (11.16)

$z \simeq [(I_{p^k} \times P_{p^{n-k-1}} \times I_p)(P_{p^{n-1}}^{-1} \times I_p)K]_{\overline{n-1}}$ (11.17)

$d: m = 1 \quad w \simeq [(I_{p^{n-2}} \times P_{p^2})(P_{p^k} \times I_{p^{n-k}})K]_{\overline{n-2}}$ (11.18)

$z \simeq [(I_p \times P_{p^{n-2}} \times I_p)(P_{p^{n-1}}^{-1} \times I_p)K]_{\overline{n-1}}$ (11.19)

$e: m \geq 2 \quad z \simeq \left[(P_{p^{n-1}} \times I_p)\prod_{t=2}^{m-1}(I_{p^t} \times P_{p^{n-t-1}} \times I_p)K\right]_{\overline{n-1}}$ (11.20)

$\alpha) \; m \geq n - k$ $w \simeq \left[(P_{p^k} \times I_{p^{n-k}})\prod_{t=1}^{m-1}(I_{p^t} \times P_{p^{n-t-1}} \times I_p)K\right]_{\overline{n-2}}$ (11.21)

$\beta) \; 2 \leq m \leq n - k \quad w \simeq \left[(P_{p^k} \times I_{p^{n-k}})\prod_{t=1}^{m-1}(I_{p^t} \times P_{p^{n-t-1}} \times I_p)K\right]_{\overline{n-2}}$ (11.22)

3. $k \geq n - 2$ $w \simeq [(P_{p^{n-2}} \times P_{p^2})K]_{\overline{n-2}}$ (11.23)

$z \simeq [(P_{p^{n-1}}^{-1} \times I_p)K]_{\overline{n-1}}$ (11.24)

$g: m = 1 \quad w \simeq [(I_{p^2} \times P_{p^{n-2}})(P_{p^{n-2}} \times I_{p^2})K]_{\overline{n-2}}$ (11.25)

$z \simeq [(P_{p^{n-2}}^{-1} \times I_{p^2})(P_{p^{n-1}} \times I_p)K]_{\overline{n-1}}$ (11.26)

$h: m \geq 2 \quad w \simeq \left[(P_{p^{n-2}} \times I_{p^2})\prod_{t=1}^{m-1}(I_{p^t} \times P_{p^{n-t-1}} \times I_p)K\right]_{\overline{n-2}}$ (11.27)

$i: 2 \leq m \leq n - 2 \quad z \simeq \left[(P_{p^{n-1}} \times I_p)\prod_{t=2}^{m-1}(I_{p^t} \times P_{p^{n-t-1}} \times I_p)K\right]_{\overline{n-1}}$ (11.28)

$j: m = n - 1 \quad z \simeq \left[(P_{p^{n-1}} \times I_p)\prod_{t=2}^{m-1}(I_{p^t} \times P_{p^{n-t-1}} \times I_p)K\right]_{\overline{n-1}}$ (11.29)

Optimal Assignments

A "down" scan of the $\Gamma_k$ matrix yields optimal assignments for two validity conditions:

1. k=0 a: k=0, m=1 w: 0 $i_0$ $j_{n-2}$ .... $j_2$ $j_1$ z: 0 $j_1$ $i_0$ $j_{n-2}$ ... $j_3$ $j_2$ b: k=0, m≧2 w: 0 $i_0$ $i_1$ ... $i_{m-1}$ $j_{n-2}$ ... $j_{m+1}$ $j_m$ z: 0 $j_m$ $i_0$ $i_1$ ... $i_{m-2}$ $i_{m-1}$ $j_{n-2}$ ... $j_{m+1}$

All other assignments generated by the "right" scan are optimal and need not be replaced.

The CGWK Matrix Spans

Using the same approach we deduce the spans of the different CGWK factorization matrices.

We have $\sigma_R(L_i) = \sigma_R(G_i) = p^{n-1}$ (11.30)

$\sigma_c(L_i) = p^{n-2}$ (11.31)

$\sigma_R(\Gamma_0) = p^{n-1}$ (11.32)

$$\sigma_c(\Gamma_0) = \sigma_c(G_0) = p^{n-1} \quad (11.33)$$

and $$\sigma_R(\Gamma_i) = p^{n-1} \quad (11.34)$$

$$\sigma_c(\Gamma_i) = \sigma_c(P^{-1}G_i) = \sigma_c(L_i) = p^{n-2} \quad (11.35)$$

Example 10.1

With $N=16$ and $M=p^m$ the pilots matrices $\beta_{k,m}$ for different values of k and m are deduced from the results shown above. In what follows the pilot elements' positions thus evaluated, associated with each $\beta_{k,m}$ and the processor dispatched thereat at the appropriate clock are listed below for some values of k and m.

$$\beta_{0,1}: \begin{bmatrix} P_{00} & & & & & & & \\ & & P_{01} & & & & & \\ & P_{02} & & & & & & \\ & & & & P_{03} & & & \\ & & & P_{10} & & & & \\ & & & & & P_{11} & & \\ & & & P_{12} & & & & \\ & & & & & & & P_{13} \end{bmatrix}$$

$$\beta_{2,3}: \begin{bmatrix} P_{00} & & & & & & & \\ & P_{40} & & & & & & \\ & P_{20} & & & & & & \\ & & P_{60} & & & & & \\ & & & P_{10} & & & & \\ & & & & P_{50} & & & \\ & & & & P_{30} & & & \\ & & & & & & & P_{70} \end{bmatrix}$$

$$B_{3,2}: \begin{bmatrix} P_{00} & & & & & & & \\ & P_{01} & & & & & & \\ & P_{20} & & & & & & \\ & & P_{21} & & & & & \\ & & & P_{10} & & & & \\ & & & & P_{11} & & & \\ & & & & P_{30} & & & \\ & & & & & & & P_{31} \end{bmatrix}$$

Example 10.2

For the matrix $B_k$ with $k=1$, $N=729$ and $M=9$ we have w={0, 81, 162, 27, 108, 189, 54, 135, 216, 1, 83, 163, 28, ...,
 2, 83, 164, ..., 218, 3, 84, 165, ..., 18, 99, 180, ...} z={0, 27, 54, 9, 36, 63, 18, 45, 72, 1, 28, 55, 10, ..., 2, 29, 56, ...,
 74, 243, 270, 297, ..., 6, 33, 60, ...}

Nine elements are dispatched in one real time clock. The memory minimum queue length MMQL=minimum pitch=$9=3^{n-2-m}$, confirming the optimality of the state assignment.

Example 10.3

For the matrix $B_k$ with $k=2$, $N=729$ and $M=243$ processors we have w={0, 81, 162, 27, 108, 189, 54, 135, 216, 9, 90, 171, 117, ...,
 18, 99, 180, ..., 3, 84, 165, ..., 6, 87, 168, ..., 1, 82, 163, ..., 2, 83, 164, ...} z={0, 27, 54, 9, 36, 163, 18, 45, 72, 243, 270, 297, 252, ...,
 486, 513, 640, ..., 3, 30, 57, ..., 6, 33, 60, ..., 1, 28, 55, ... 2, 29, 56, ...}

MMQL=1. We note that if M=81 we obtain the same w and z values but here 81 pilot elements are dispatched in one clock rather than 243 as is the case for m=5. With m=4 the MMQL=3.

Example 10.4

For the matrix $\Gamma_k$ with $k=3$, $N=729$ and $M=3$. The "right" scan emphasizing scanning the upper rows before performing p-ary division from the top down using the above $\Gamma_k$ results we obtain w={0, 9, 18, 1, 10, 19, 2, 11, 20, ..., 8, 17, 26, 27, 36, 45, 54, 63, 72, ...,
 57, 66, 165, ..., 243, 252, 261, 244, 253, ..., } z={0, 81, 162, 3, 84, 165, 6, 87, 168, ..., 24, 105, 186, 27, 108, 189,
 54, 135, 216, ..., 141, 222, 403, ..., 1, 82, 163, 4, 85, ...}

We note that:

MMQL=minimum pitch=9

With m=1 the optimal memory queue length=27. Using a "down" scan, applying a p-ary division from top down we obtain the optimal assignment by a simple shuffle of the above values:

w={0, 27, 54, 1, 28, 55, ..., 8, 35, 62, 9, 36, 63, 10, 37, 56, ...} z={0, 27, 54, 3, 30, 57, 6, 33, 60, 9, ..., 24, 51, 78, 81, 108, 135, 84, 111, 138, ...}

DETAILED DESCRIPTION OF THE PREFERRED EMBODIMENTS

Figure 1:
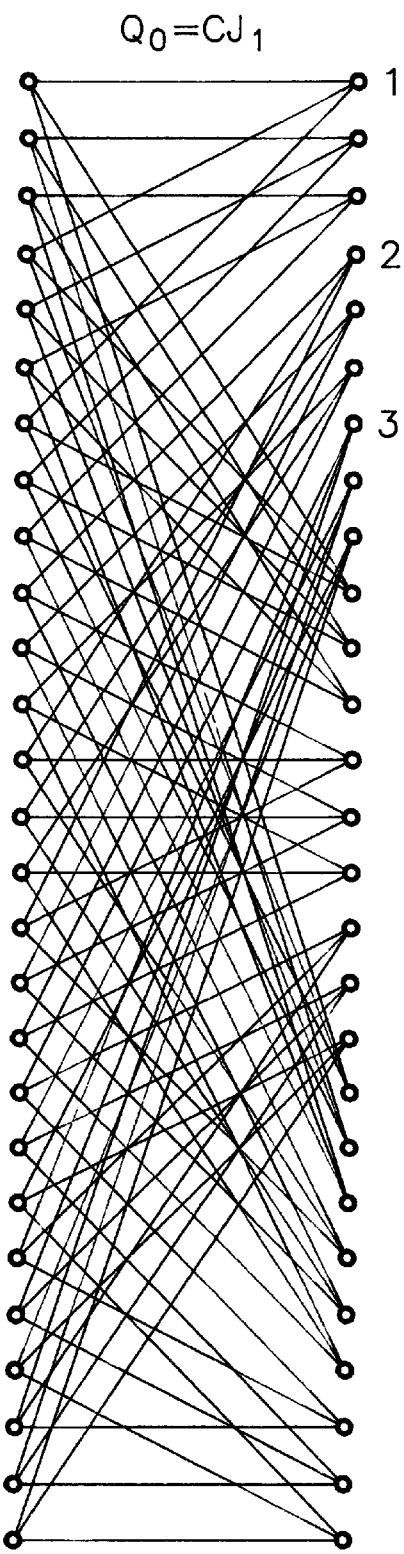
FIG. 1: The initial dispatching of processors indicated by numbers 1, 2, 3, affixed next to the assigned pilot elements at clock zero for the case N=27, p=3, n=3 and M=3 of the optimal factorizations of matrices $Q_k$, with k=0.
Figure 2:
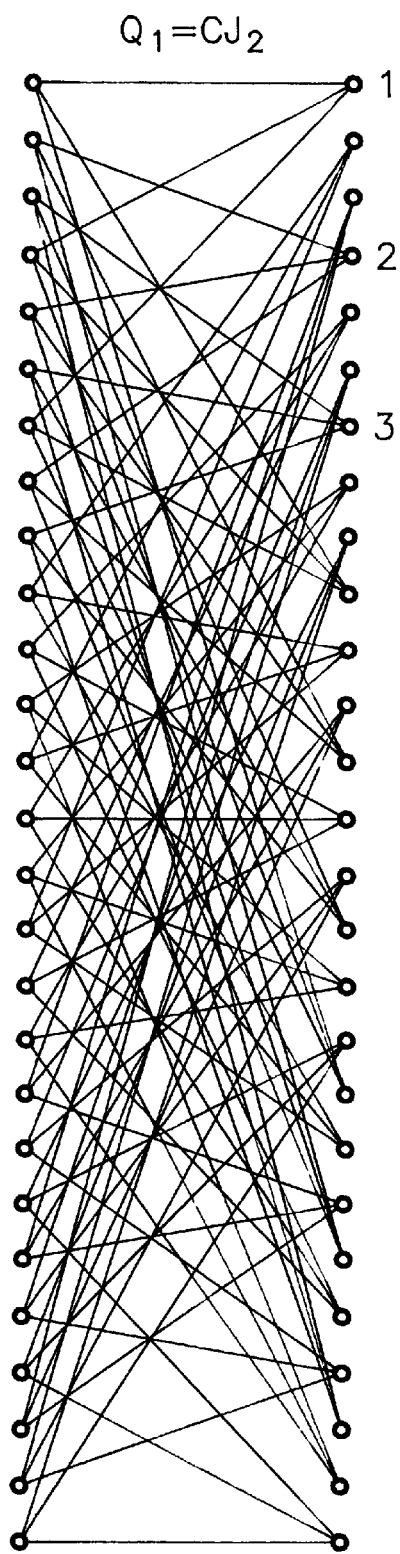
FIG. 2: The initial dispatching of processors indicated by numbers 1, 2, 3, affixed next to the assigned pilot elements at clock zero for the case N=27, p=3, n=3 and M=3 of the optimal factorizations of matrices $Q_k$, with k=1.
Figure 3:
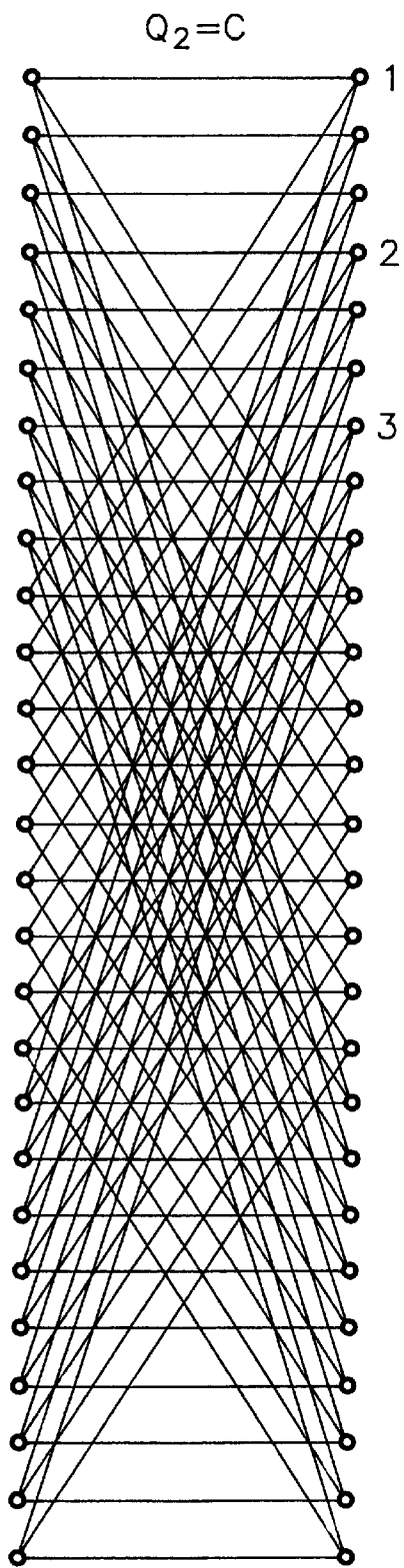
FIG. 3: The initial dispatching of processors indicated by numbers 1, 2, 3, affixed next to the assigned pilot elements at clock zero for the case N=27, p=3, n=3 and M=3 of the optimal factorizations of matrices $Q_k$, with k=2.

FIGS. 1, 2 and 3 show the initial dispatching of processors indicated by numbers 1, 2, 3, affixed next to the assigned pilot elements at clock zero for the case N=27, p=3, n=3 and M=3 of the optimal factorizations of matrices $Q_k$, with k=0, 1 and 2, respectively.

Figure 4:
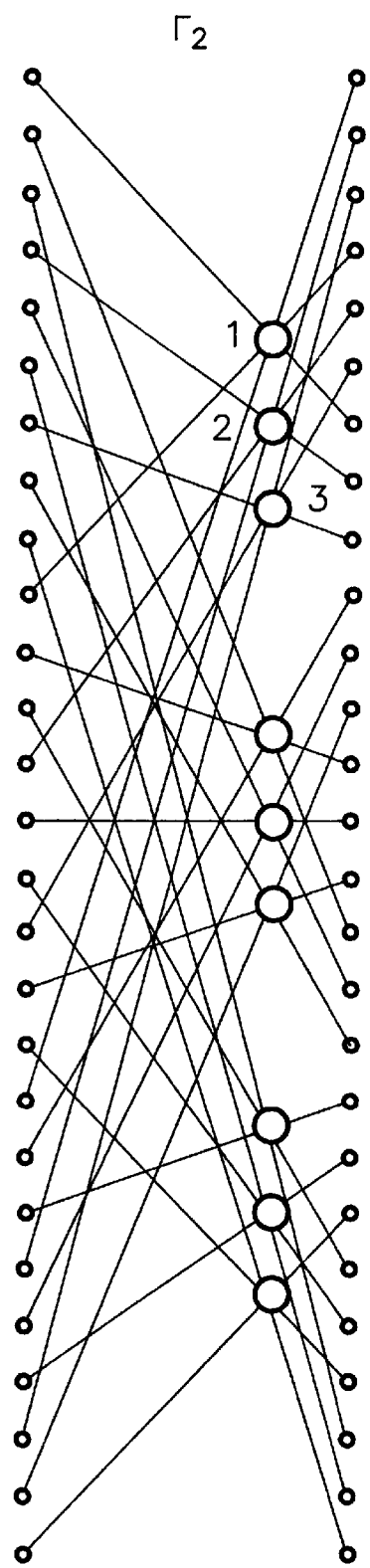
FIG. 4: The initial dispatching for the optimal factorization of matrix $\Gamma_k$ with k=2, where the processing elements are represented by circles and those selected at clock zero are shown with the numbers 1, 2 and 3 affixed next to them.

FIG. 4 shows the corresponding dispatching for the optimal factorization of matrix $\Gamma_k$ with k=2, where the processing elements are represented by circles and those selected at clock zero are shown with the numbers 1, 2 and 3 affixed next to them.

It is noted that with larger values of N, as shown in the above examples, the optimal dispatching is obtained by a 'down' scan rather than a 'right' scan, that is, by following the state assignment algorithm. It is also noted that other state assignments may be applied but the proposed approach is optimal and any other approach would be either less optimal or at best equivalent to this proposed approach.

A complete solution of state assignment and sequencing of a single base-p processor to the ultimate massively parallel $M=p^{n-1}$ processors has been presented. Pilot elements addresses and matrix spans to locate their satellites are automatically generated for dispatching and sequencing the parallel processors. Applications are shown on image processing and generalized spectral analysis optimal transforms. The same approach can be directly applied to cases where the matrix is post rather than pre multiplied by shuffle matrices and vice versa. It can also be applied to matrices of general structure and to sub-optimal algorithms, where the span is neither p-optimal nor $p^2$-optimal.

REFERENCES

[1] M. J. Corinthios, "Optimal Parallel and Pipelined Processing Through a New Class of Matrices with Application to Generalized Spectral Analysis", IEEE Trans. Comput., Vol. 43, April 1994, pp. 443–459.

[2] M. J. Corinthios, "3-D cellular arrays for parallel/cascade image/signal processing", in Spectral Techniques and Fault Detection, M. Karpovsky, Ed. New York: Academic Press, 1985.

[3] M. J. Corinthios, "The Design of a class of fast Fourier Transform Computers", IEEE Trans. Comput., Vol. C-20, pp. 617–623, June 1971.

[4] G. Hasteer and P. Banerjee, "A Parallel Algorithm for State Assignment of Finite State Machines", IEEE Trans. Comput., vol. 47, No. 2, pp. 242–246, February 1998.

[5] O. A. Mc Bryan and E. F. Van De Velde, "Hypercube Algorithms and Implementations", SIAM J. Sci. Stat. Comput., Vol. 8, No. 2, pp. s227–287, March 1987.

[6] H. S. Stone, "Parallel Processing with the Perfect", IEEE Trans. Comput. Vol. C-20, No. 2, pp. 153–161, February 1971.

[7] V. Kumar, A. Grama, A. Gupta and G. Karypis, "Introduction to Parallel Computing", Benjamin/Cummings, Redwood, Calif., 1994.

[8] K. E. Batcher, "Design of a Massively Parallel Processor", IEEE Trans. Comput, pp 836–840, September 1980.

[9] H. S. Stone, "High-Performance Computer Architecture", Addisson-Wesley, Reading, Mass., 1993.

[10] K. Hwang, "Advanced Computer Architecture: Parallelism, Scalability, Programmability", McGraw Hill, New York, N.Y., 1993.

[11] D. H. Lawrie, "Access and Alignment of Data in an Array Processor", IEEE Trans. Comput., vol C-24, No. 2, December 1975, pp 1145–1155.

[12] Roziner, T. D., Karpovsky, M. G., and Trachtenberg, L. A., "Fast Fourier Transforms over Finite Groups by Multiprocessor Systems", IEEE Trans. Accous., Speech, and Sign. Proc., ASSP, vol. 38, No. 2, February 1990, pp 226–240.

[13] Taylor, G. F., Steinvorth, R. H., and MacDonald J., "An Architecture for a Video Rate Two-Dimensional Fast Fourier Transform processor", IEEE Trans. Comput., vol. 37, No. 9, September 1988, pp 1145–1151.

[14] Jou, Y.-Y. and Abraham, J. A., Fault tolerant FFT Networks", IEEE Trans. Comput., vol. 37, No. 5, May 1988, pp. 548–561.

[15] Moraga, Claudio, "Design of Multiple-Valued Systolic System for the Computation of the Chrestenson Spectrum", IEEE Trans. Comput., Vol. C-35, No. 2, February 1986, pp 183–188.

[16] Sloate, H., "Matrix Representation for Sorting and the Fast Fourier Transform", IEEE Trans. Circ. And Syst., Vol. CAS-21, No. 1, January 1974, pp 109–116.

[17] Galles, Michael B., "Hierarchical Fat Hypercube Architecture for Parallel Processing Systems", U.S. Pat. No. 5,699,008, September 1997.

[18] Ho, Ching-Tien, "Method for Performing Matrix Transposition on a Mesh Multiprocessor . . . with Concurrent execution of Multiprocessors", U.S. Pat. No. 5,644,517, July 1997.

[19] Cypher, Robert. E., "Hierarchical Network architecture for Parallel Processing Having Interconnection Between Bit-Addressible Modes Based on Address Bit Permutations", U.S. Pat. No. 5,513,371, April 1996.

[20] Swartztrauber, Paul-Noble, "Multipipeline Multiprocessor System", U.S. Pat. No. 5,689,722, November 1997.

[21] Kogge, Peter, "Dynamic Mutiple Parallel Processing Array", U.S. Pat. No. 5,475,856, December 1995.

[22] Shyu, Rong-Fuh, "Recycling and Parallel Processing Method . . . for Performing Discrete Cosine Transform and its Inverse", "U.S. Pat. No. 5,471,412, November 1995.

[23] Brantly, Jr., William, C., McAuliffe, K. P., Norton, V. A., Pfister, G. F. and Weiss, J., U.S. Pat. No. 4,980,822, December 1990.

[24] Morton, Steven, G., "Single Instruction Multiple Data stream Cellular Array Processing Apparatus Employing Multiple State Logic for Coupling to Data Buses", U.S. Pat. No. 4,916,657, April 1990.

[25] Luc Mary and Barazesh, Balman, "Processor for Signal processing and Hierarchical Multiprocessing Structure Including At Least One Such Processor", U.S. Pat. No. 4,845,660, July 1989.

[26] Corinthios, Michael J., "General Base State Assignment for Massive Parallelism", submitted for consideration toward publication, IEEEE Trans. Comput., May, 1998, pp 1–30.

I claim:

1. A processor comprising general base processing elements and a partitioned memory, said processor being configured using a pilots matrix and a general base, denoted p, hypercube transformations where p is an arbitrary integer, for dispatching and sequencing $M=p^m$ general base p processing elements, m being an integer and effecting contention-free memory partitioning for parallel processing of products of general base p factorizations and decompositions of N×N matrices where $N=p^n$, n being an arbitrary integer.

2. A processor comprising general base processing elements and a partitioned memory, said processor being configured using a pilots matrix and a general base, denoted p, hypercube transformations where p is an arbitrary integer, for dispatching and sequencing $M=p^m$ general base p processing elements, m being an integer and effecting contention-free memory partitioning for parallel processing of products of general base factorizations of N×N matrices where $N=p^n$, n being an arbitrary integer, applied to one of a Generalized-Walsh-Chrestenson Transform matrix and a Fourier Transform matrix.

3. A processor as in claim 1, applied to image processing.

4. A process as in claim 2, applied to image processing.

* * * * *